United States Patent
Dominke et al.

[11] Patent Number: 6,092,006
[45] Date of Patent: Jul. 18, 2000

[54] HIERARCHY SYSTEM FOR CONTROLLING A VEHICLE

[75] Inventors: Peter Dominke, Bietigheim-Bissingen; Holger Bellmann, Ludwigsburg; Jens-Olaf Mueller, Leonberg; Torsten Bertram, Duesseldorf; Asmus Volkart, Bietigheim-Bissingen; Christian Grosse, Kornwestheim; Wolfgang Hermsen, Rodgau, all of Germany

[73] Assignee: Robert Bosch GmbH, Stuttgart, Germany

[21] Appl. No.: 09/035,790

[22] Filed: Mar. 6, 1998

[30] Foreign Application Priority Data

Mar. 7, 1997 [DE] Germany ............................ 197 09 318

[51] Int. Cl.⁷ ...................................................... G05D 1/00
[52] U.S. Cl. .................................. 701/1; 701/27; 701/57; 701/77; 701/106; 701/40; 701/44; 701/98; 370/539; 370/541
[58] Field of Search ...................................... 701/1, 27, 57, 701/77, 106, 40, 44, 98; 370/539, 541

[56] References Cited

U.S. PATENT DOCUMENTS

| | | |
|---|---|---|
| 4,727,541 | 2/1988 | Mori et al. .............................. 370/535 |
| 4,930,084 | 5/1990 | Hosaka et al. ............................ 701/98 |
| 5,189,617 | 2/1993 | Shiraishi .................................. 701/48 |
| 5,351,776 | 10/1994 | Keller et al. . |
| 5,467,277 | 11/1995 | Fujisawa et al. ......................... 701/51 |
| 5,471,559 | 11/1995 | Yasunobu et al. ........................ 706/52 |
| 5,555,201 | 9/1996 | Dangelo et al. ........................ 364/489 |
| 5,794,165 | 8/1998 | Minowa et al. ............................. 701/1 |
| 5,801,958 | 9/1998 | Dangelo et al. ........................ 364/489 |
| 5,890,078 | 3/1999 | Furuta ....................................... 701/1 |

OTHER PUBLICATIONS

Fuzzy systems handbook, second edition, Earl Cox, foreword by Lotfi A. Zadeh.

*Primary Examiner*—William A. Cuchlinski, Jr.
*Assistant Examiner*—Olga Hernandez
*Attorney, Agent, or Firm*—Walter Ottesen

[57] ABSTRACT

A control system for a motor vehicle has several components for carrying out different tasks to control the vehicle. The data, which are necessary from the components, are acquired independently by the components either via data interrogation or via request relationships.

5 Claims, 5 Drawing Sheets

6,092,006

HIERARCHY SYSTEM FOR CONTROLLING A VEHICLE

BACKGROUND OF THE INVENTION

The future requirements made on an automobile with respect to technical possibilities are considerable. The solution to this problem is furthermore subjected to an increasing cost pressure. The functions in the vehicle must be integrated into a system configuration in order to achieve additional functionality at low cost. One such system configuration is, for example, disclosed in U.S. Pat. No. 5,351,776. Here, a control of the total vehicle at least with respect to drive train and brake is suggested. The control exhibits a hierarchial command structure for the control tasks. The control structure described in this patent includes coordinating elements which convert a command, which is issued from a higher hierarchial level, into commands or assignments for elements of a lower hierarchial level. The contents of the commands, which are transmitted from above to below in the hierarchial structure, define, inter alia, physical variables which determine the interfaces between the individual hierarchial levels. The interfaces orientate themselves to the physical characteristics of the vehicle movement, especially, of the drive train and the brake.

In addition to a regimentation for the issuance of commands in a structure for a total vehicle, a structured information acquisition by the elements of the individual levels is a necessary precondition. This is necessary to provide understandability, the energy capability and the functionality of the system configuration. This applies, above all, when further systems, such as the on-board network management, are included in the existing system configuration. Here, a structured information acquisition should include the least possible communication relationships with physically purposeful, exchangeable information. A suggestion as to a structured acquisition of information is not suggested in the above-mentioned state of the art.

SUMMARY OF THE INVENTION

It is an object of the invention to provide a structured acquisition or procurement of information as discussed above.

The control system of the invention is for a vehicle and includes: a plurality of components arranged in the context of a hierarchy at different levels thereof; a first one of the components being at a first level; a second one of the components being at a second level lower than the first level; the second component being adapted to receive and execute commands from the first component; the components being adapted to exchange information between each other and each one of the components being adapted to be an interrogating component to acquire that data needed by the interrogating component independently by data interrogation and/or request relationships from an interrogated one of the components; the interrogated component being adapted to make the data available to the interrogating component; and, the interrogated component always being allocated to the highest level whereat the data are needed for forming commands or for processing commands.

A structured acquisition of information is described which can easily be integrated into a structure of a total vehicle. In this way, the individual components acquire the needed information for executing the tasks assigned thereto. As information generators, operator-controlled elements, sensors, estimators, memory for data and the like exist on an equal-access basis. The communication strictly for information procurement takes place via data interrogation and/or request relationships. For a data interrogation, the interrogated component makes available the data without the evaluation thereof being of importance to the interrogated component (for example, sensor whose measured value is interrogated). In contrast, for a request relationship, the component, which is interrogated, makes available the requested information, for example, a desired variable which could be realized from another component (such as an accelerator pedal, automatic speed controller, travel dynamic controller, which output desired values which are later selected by another element in the context of pregiven priorities). In addition to data interrogation and request relationship, which serve for the acquisition of information, there are commands which define the actually executed desired variables.

It is especially advantageous that the making available of information remains up to the interrogated or demanding component and is hidden to the particular communication partner. In this way, mutual dependency of the components is reduced.

A structured procurement of information with any desired communication relationship on the same hierarchial level and communication from below to above in the hierarchy ensures a component encapsulation and supports the exchangeability of the components as well as a formation of systems having variations. The components remain uninfluenced with respect to the number and type of interfaces when there is an exchange.

In an advantageous manner, information generators are always allocated to that level in the command structure which is defined by the information made available. For example, an ignition key is at a very high level. In contrast, a switch for the sun roof is assigned to a very low level. In this way, the exchangeability of components (for example, sun roof with sun-roof switch) is significantly improved.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
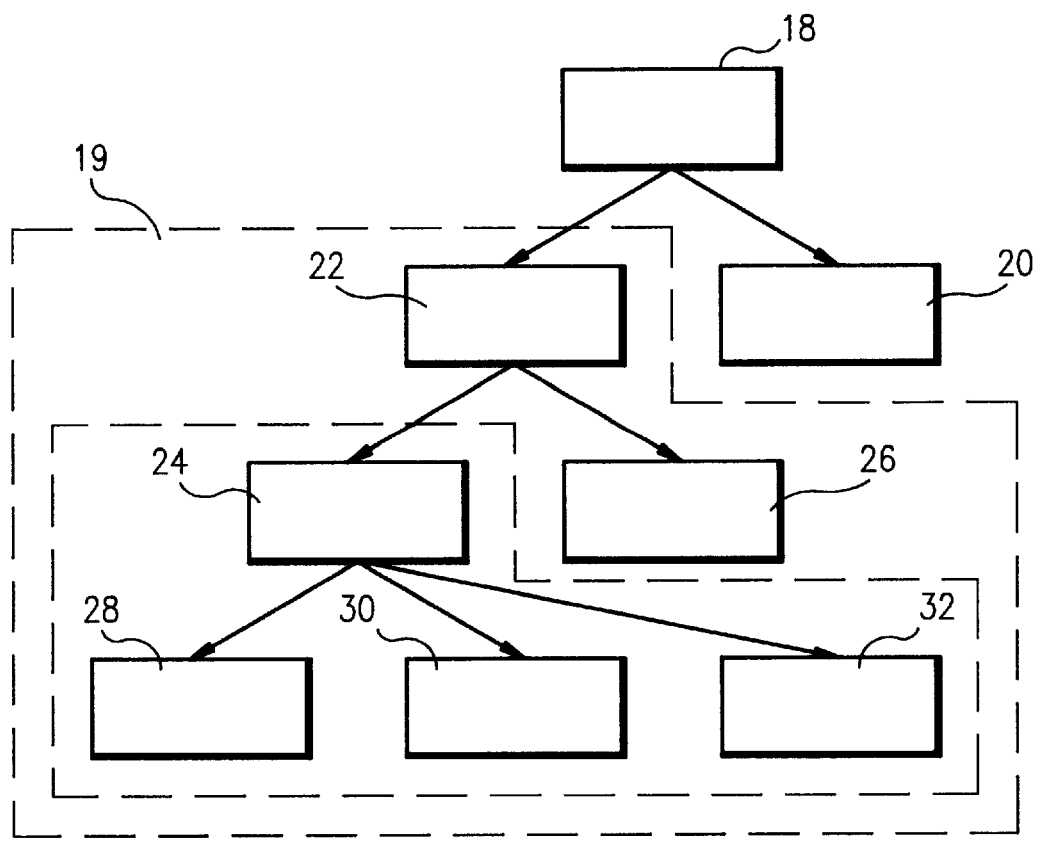
FIG. 1 is a schematic showing an example of a control system having several levels in a hierarchial configuration.

FIG. 1 shows an example of a control system having several levels in hierarchial configuration. Reference numeral 18 identifies a coordinating element for the total vehicle which gives commands to two systems or components 19 and 20 in the example shown. In one embodiment, the system 19 defines a system for controlling the drive train (engine and transmission). The second system 20 defines, for example, a system for controlling the brakes of the vehicle or a system for controlling the generator and battery. In FIG. 1, the system 19 is further refined into two detailing levels and the components 22, 24, 26, 28, 30 and 32 are provided. The coordinator 22 coordinates engine and transmission 26 whereas the downstream coordinator 24 controls the engine via the power variables: ignition 28, air supply 30 and fuel metering 32. A corresponding refinement can also be undertaken with respect to the system 20. The interfaces between the shown elements orientate themselves to the physical characteristics. Accordingly, the interface between the coordinator 18 and the system 19 is described by the physical variable "mechanical energy"; whereas, the interface between the components 18 and 20 in the case of a control system for generator and battery is described by the variable "electric energy". Correspondingly, the interfaces between the component 22 and the component 24 and between component 22 and component 26 are described by the physical variables "mechanical energy" of the engine and the transmission ratio. To execute the tasks assigned, all components need selected data. In the following, the procurement of information according to the invention by the individual components is described.

Figure 2:
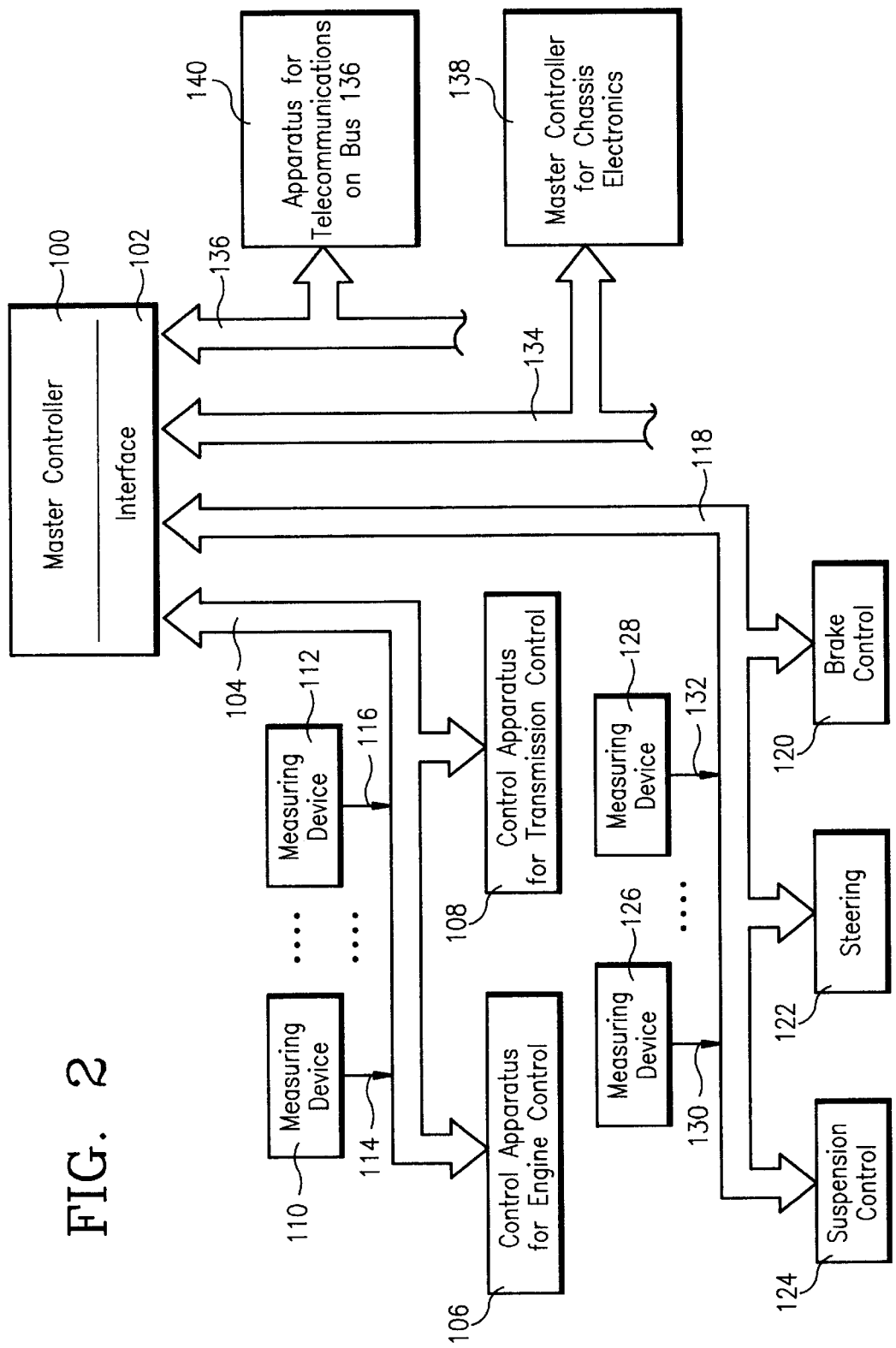
FIG. 2 is an example of the hardware configuration of a network control system for a motor vehicle.

In FIG. 2, a configuration of a control system for a vehicle is shown in the context of a block circuit diagram.

Here, reference numeral 100 identifies a so-called master controller which includes, inter alia, an interface 102 (gateway) to which various bus systems are connected. The allocation of these bus systems is exemplary.

The first bus system 104 defines the communication between the master controller 100 and the elements controlling the drive torque. The bus 104 connects the master controller 100 to a control apparatus 106 for engine control and a control apparatus 108 for transmission control.

On the other hand, the bus 104 is connected via corresponding lines 114 to 116 to respective measuring devices 110 to 112. These measuring devices detect the operating variables of the engine and/or of the vehicle such as: road speed, engine rpm, supplied air quantity or air mass, load, exhaust-gas composition, engine temperature, transmission ratio, shift state of the converter, knocking tendency, et cetera. These operating variables are to be evaluated for the control of the drive torque.

A second bus 118 connects the master controller 100 (that is, its interface 102) to elements for brake control 120, steering 122 and/or for suspension control 124.

In the same manner as presented above, operating variables are transmitted from measuring devices 126, 128 via respective connecting lines 130 to 132 to bus 118. These operating variables are those of the engine and/or of the vehicle such as wheel rpms, spring/shock absorber displacements, braking forces, axle loads, et cetera. Furthermore, additional bus systems 134 and 136 are provided which preferably operate at different transmitting rates than the systems 104 and 118. These bus systems connect the master controller 138 of the chassis electronics (generator, light, seat position, window lifters, sun-roof drive, et cetera) on bus 134 and, if required, to apparatus 140 for telecommunications on bus 136. Corresponding measuring devices are connected to these bus systems (for example, seat position, radio transmitter, sun-roof switch, et cetera). The actuating elements and actuators, which are necessary to influence the engine, brake system, et cetera, are either connected to the particular control unit or to the particular bus.

The configuration shown in FIG. 2 defines an example which can be used in other embodiments, for example, by omitting the master controller 100. What is essential is that the data procurement in accordance with the invention, which is described below, is independent of the specific configuration of control systems on the hardware level and permits an optimized configuration of individual elements of the control system in accordance with space availability, susceptibility to faults and the like. On the other hand, the procedure provided by the invention permits a hardware configuration, which is adapted to the data procurement, when, for example, the systems for drive train control and for controlling generator and battery are arranged in the particular control units; whereas, the responsible higher-order total coordinator is placed in master controller 100.

In the following, a system is understood to be a quantity of components between which specific relationships exist or which are to be used in accordance with specific patterns. The components can themselves define systems. A system also includes a system boundary as well as an interface to the environment. If the system is itself a system, then it can be viewed by the system as a subsystem and in the view of the component, the system itself can be referred to as a system configuration. An example is system 19 for drive train control as shown in FIG. 1. The system "drive train control" comprises different components. For example, the component of transmission control 26 can be seen as a further subsystem when the transmission control itself is subdivided into several hierarchial detail levels. A further subsystem of the system "drive train control" is defined by the engine control which is refined into detailing levels comprising coordinator 24 and the components 28 to 32.

The future vehicle controls develop their full functionality only when they are integrated to a system configuration having several other systems and components (for example, drive train having chassis electronics, generator control, et cetera). The system configuration formed in this manner is suitable for complete optimization with respect to safety, consumption, comfort, burden on the environment, et cetera. As mentioned in the state of the art originally referred to herein, the system configuration is built up hierarchically with respect to its command output. This hierarchial command output requires an order in the system configuration. In addition to command output to a system or to a component, the procurement of data for processing commands has to be regulated so that, on the one hand, the command can be satisfied and, on the other hand, that the order of the system configuration remains intact.

According to the invention, the making available of data is not coupled to the issuance of a command specific to a component. Each component in the structure of the total vehicle procures independently the data which are necessary for executing the command. Here, it has been shown that systems comprise components which all can be interrogated for data or of which requests can be made and which thereby step forward as data generators. However, specific components having exclusively the task to process and make available data to other components. Typical data generators of this kind are operator-controlled elements (user command), sensors, estimators (algorithms), memories of data (such as vehicle variables, environmental variables, et cetera). The mentioned components are gathered under the term "data generators" because this is essentially their common task from a structuring point of view.

An example of a replacement of a sensor (component) by an estimator (algorithm) makes clear that, from the viewpoint of the rest of the structure, it is advantageous when this is independent of the manner in which the data is procured. Those components, which interrogate the particular data, then do not have to be changed when, for example, in lieu of a sensor, an estimator is utilized. Another variation with precisely the same interfaces is used only by the data-emitting component. The same applies to the replacement of an operator-controlled element (operated by the driver) with an assistance system. An example of this is the feeding in of a driver command with respect to vehicle speed selectively via the accelerator pedal or via the road speed controller. The components, which are responsible for realizing the vehicle propulsion, should operate independently as to how the inputs originated.

For the procurement of data, it has been shown that one should distinguish between a data interrogation and a request relationship. The data interrogation and the request relationship describe the communication relationships in a system or a system configuration. A communication relationship always proceeds from a source component to a target component. The data interrogation takes place from the interrogator (source component) to the data-generating component (target component) and the request relationship proceeds from the demanding component (source component) to the requested component (target component). In a data interrogation, the data-outputting component does not know who needs the data and what the data will be used for. The component is strictly a service component for which it is of no interest in the execution of its tasks whether the data is to be evaluated or is to be part of a command. Examples of components of this kind are, for example, especially sensors or estimators which make available the value of an operating variable to the interrogator upon being interrogated.

In contrast, in a request relationship, the data made available to the component being interrogated is converted by the data made available to the requesting component. Examples of such components are the engine control whose requirement as to electrical energy is transmitted from a coordinator to a generator control or the generator control whose requirement as to mechanical energy is transmitted by a coordinator to the engine control. Here, precisely one component exists which takes into consideration the data for conversion of the request.

Figure 4:
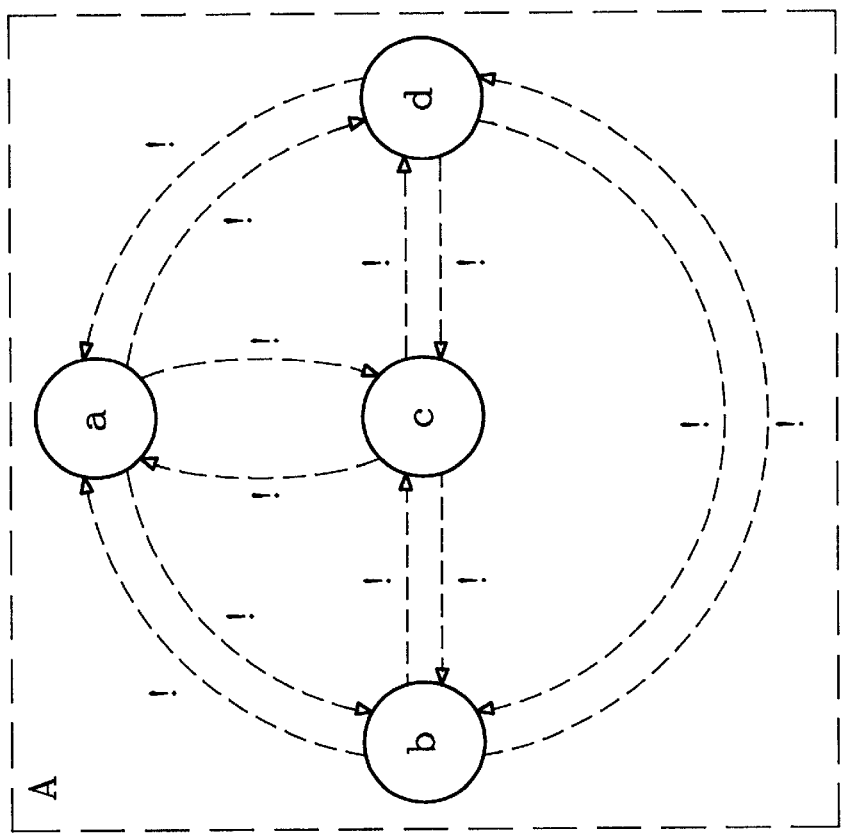
FIG. 4 shows the corresponding request relationships.
Figure 3:
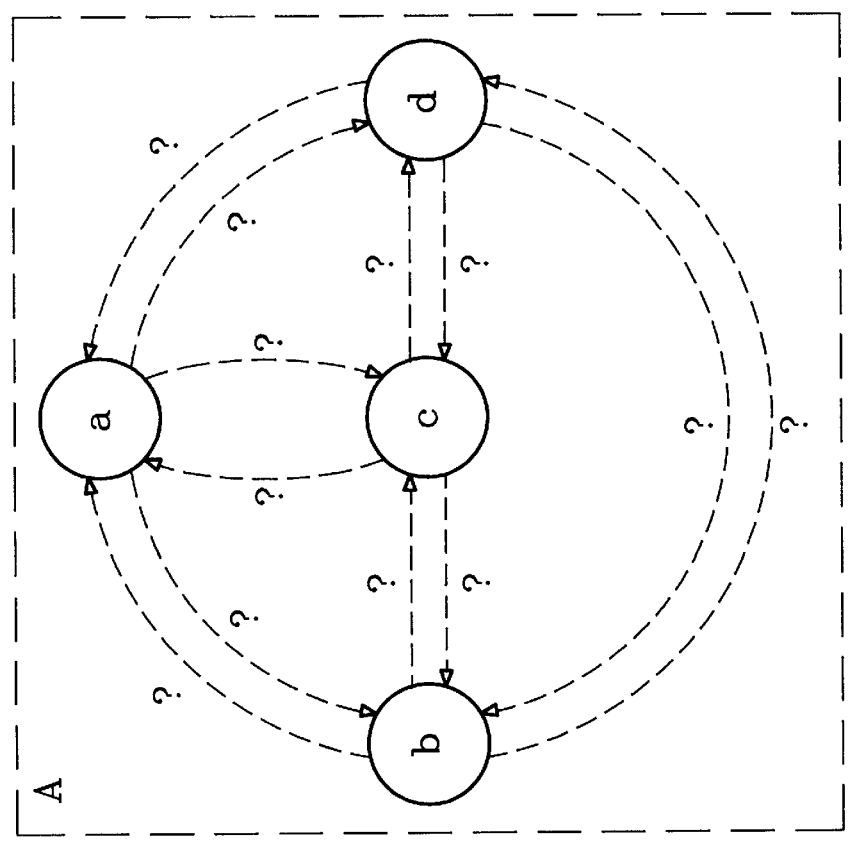
FIG. 3 is a schematic showing the configuration of the data interrogation within a system or within a component.
Figure 5:
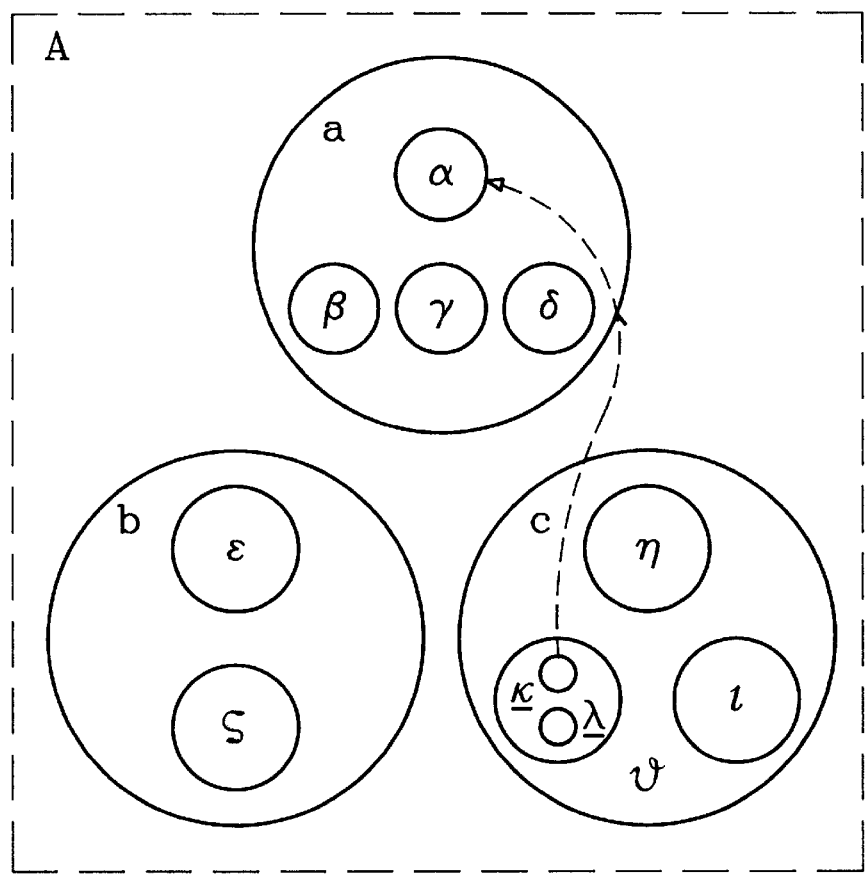
FIG. 5 shows the data interrogations or request relationships across the boundaries of a component.

In order to clearly configure the information procurement via data inquiry and request relationship, structural basics must be determined. Here, one must distinguish between the statements for the communication (data inquiry and request relationship) within a system and across the system boundaries of a component. The structuring basics described below relate to the communication within a system (FIGS. 3 to 5). For the continuation of existing communication relationships across the system boundaries, the inputs of other structural statements apply (see FIG. 6).

FIG. 3 shows the structuring basics within a system for data inquiries and FIG. 4 for request relationships. The system A shown in each of FIGS. 3 and 4 comprises the individual components a, b, c and d. According to FIG. 3, a data inquiry (?) is possible from each component to every other component. Correspondingly, a request relationship (!) is possible from each component to every other component in accordance with FIG. 4. Here, it is not necessary for each communication relationship to exist. For example, if one of the components is a sensor, then the communication relationships of the sensor to other components are not necessarily present in the sense of a data inquiry.

For the procurement of data in accordance with the invention, it is essential that the number of different communication types be limited to two. An issuance of a command is not a communication relationship for procuring data. In this way, the communication for data procurement which takes place and its direction can be clearly configured. This supports an exchangeability of the components having defined interfaces (and therefore possible communication relationships). The used communication relationships are sufficient in order to indicate the logical cooperative relationship of the components as well as the significance of the communication relationship for a component. The data inquiry defines a data exchange wherein the data generator only makes available the data and is independent of further processing of the data.

The permitted data inquiries or request relationships define features of the components. Not every communication should pass via the command generator of the component because the command generator would otherwise be overloaded and it would have to have too many detail functions. Furthermore, a dependency of the command generator from the interrogated component would result which is not wanted in view of the exchangeability of the individual components and the clarity of the system configuration. With the term component, not necessarily a hardware component is meant. Rather, a component is understood to be a part of an entirety in the context of the general definition. Accordingly, hardware and/or software modules can be considered components.

If the communication relationships go beyond the system boundaries of a component, then other structuring specifics must be had. Thus, the data interrogation and request relationships are possible only in higher levels. Accordingly, only higher levels can be passed through in the direction toward the target components. This is shown in FIG. 5. There, a system A is shown wherein the components a, b and c are refined into further systems. For example, the system of the component a comprises the four components $\alpha$, $\beta$, $\gamma$ and $\delta$ and the components b and c are subdivided correspondingly. In system c, a component $\delta$ is shown which is further refined into the components $\kappa$ and $\lambda$. In this way, the configuration shown in FIG. 5 has a total of four levels, a level A, a level a, b and c, a level having $\alpha$, $\beta$, et cetera and a level having the components $\kappa$ and $\lambda$. The levels are identified as abstraction levels wherein the degree of abstraction is understood to be from below to above or as detailing level wherein the degree of refinement of the system is understood in the view from above to below. A refinement is then present when components of a system are again viewed as a system.

In the example of FIG. 5, a communication relationship exists between the component $\kappa$ and the component $\alpha$. The data is actually made available by the component $\alpha$ which occurs only with the refinement of the component a. On the abstraction level, which is defined by the components a, b and c, the component $\alpha$ is not known to the components b and c. For this reason, the communication arrow for information procurement ends at the boundary of the component a and is guided from there by the component itself to the target component $\alpha$. The source component of the data interrogation or request relationship (here $\kappa$) knows the systems (target components) on the abstraction level but not their refinement and can therefore not look into the interior of a component. In this way, an independence of the source component is reached and the exchangeability and the variation formation are supported. Furthermore, the data flow always leads directly to the target component of the corresponding abstraction level in order to avoid loading and dependencies of additional components. In total, a system results from the structuring specifics which is open for the data interrogation or request relationship in the refinement upwardly in the direction of the abstraction levels but remains closed downwardly in the direction of the detailing planes (see FIG. 5).

If communication relationships exist between two systems, then structural specifics are to be determined as to how these communication relationships should be continued with a refinement of at least one of the systems. Here, when the component, which is to be refined, is a target component of a data interrogation or request relationship, then, for the refinement of this component (subsystem), precisely one desired component of the next detailing level is target component for this communication relationship. If the component is a source component of a data interrogation or request relationship, then, for a refinement of this component (subsystem), precisely one desired component of the next detailing level is source component for this communication relationship.

Figure 6:
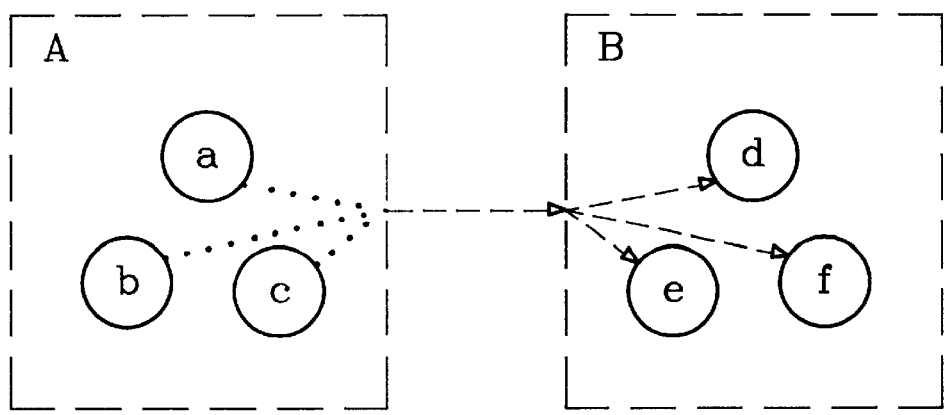
FIG. 6 shows a data interrogation or request relationship between two components with possible continuations of the existing communication relationship within the refined components. In a concrete realization, precisely one of the shown possibilities can be realized within each component; and, FIG. 7 shows an example for the arrangement of different data generators.

This is shown in FIG. 6. Here, two systems A and B are shown between which a communication relationship exists. The two systems are refined in a first detailing level into components a, b, c and d, e, f, respectively. System A is a source component and system B a target component. According to the above-described structuring rules, it applies that the possible continuation of the target component is one of the components d, e or f; whereas, the possible source component is one of the components a, b or c.

For another data interrogation or request relationship between components A and B, the target component as well as the source component of the refinement can be changed. Because of the semipermeable structure, the arrow for illustrating the communication relationship ends at the boundary of system B and is continued from there in accordance with system B.

The data interrogation or request relationship can end at any desired component in the refinement. In this way, this communication in the detailing level does not take place via the command generator of the refined component and relieves the latter. The allocation of the source component of a data generator or request relationship takes place for the purpose of relieving the command generator of the source component of load in the refinement. This means that the interfaces of the target components for the data interrogation as well as the request relationship must be known to the source components within the refinement.

A further important input for the data acquisition concerns the arrangement of the data generators in the control structure.

The data generators are always allocated in the detailing planes which are described by the data. As an example, the vehicle mass is mentioned which characterizes the total vehicle and therefore is allocated to an information generator on a very high abstraction level. All subsystems can access this mass and no operating states are conceivable in which different systems need different vehicle masses. However, this value, which is available to all, can be changed as a function of time when detecting a change of load. This information is then, in turn, available to the same extent to all subsystems. In contrast, the data, which relate to the state of the switch for actuating a sun roof, can be assigned a lower detailing level wherein the sequences of actuating the sun roof are structured. The data is irrelevant for all other detailing levels up to now. Therefore, this data is to be configured and considered only in the lowest possible refinement where it is needed for giving a command to the sun or slide roof.

Figure 7:
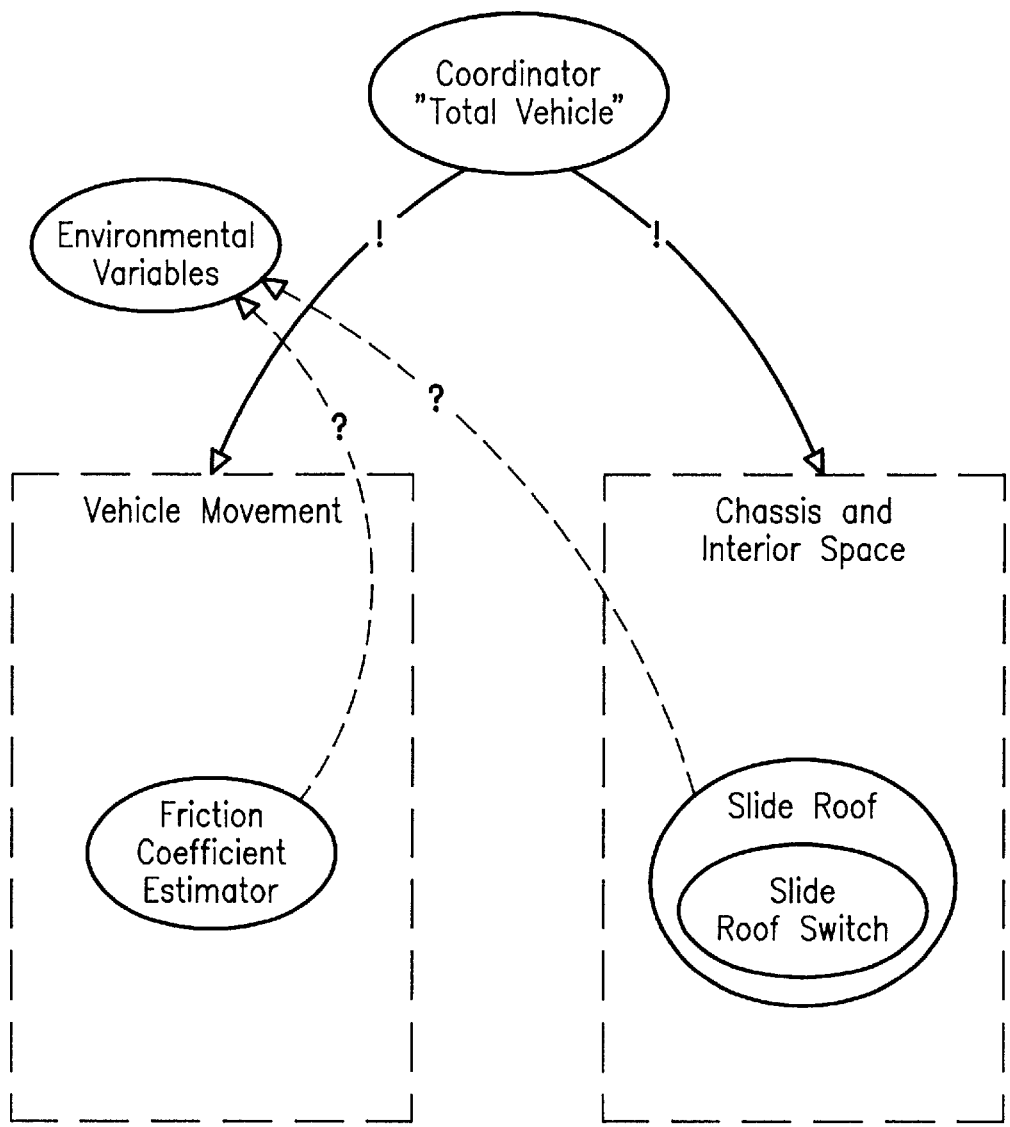

A corresponding example is shown in FIG. 7. Here, the systems "vehicle movement" and "chassis and interior space" are given. The data generator, which is essential for movement, is a friction value estimator realized in the detailing level of the system "vehicle movement"; whereas, the above-mentioned data generator "sun roof switch" is arranged in a lower detailing level "sun roof" of the system chassis and interior space. FIG. 7 shows further that a coordinator "total vehicle" is at a higher level than both systems. This coordinator is connected via two communication relationships to the two systems. Furthermore, a component "environmental variables" is shown in a very high level which is coupled via data interrogations to the coefficient of friction estimator and the subsystem "sun roof" (there, for example, with a sun-roof switch).

With the data acquisition in accordance with the invention, the data is always available where it is needed for formulating commands. Furthermore, it is achieved that variation-specific data generators exist only in the variations wherein they are needed. It results that specific data generators, such as operator-controlled elements for the user, are generally not allocated to a level. As an example, an ignition switch and a sun roof switch can be mentioned. The ignition switch is at a high abstraction level because of the influence on almost all components. In contrast, the sun roof switch is at a lower detailing level and only in the variations in which a sun roof is present.

In view of the above, data generators exist at all detailing levels which make available such data which define the affected level.

On a very high abstraction level, these are vehicle variables which relate to the entire vehicle (vehicle mass, vehicle speed, et cetera), environmental variables, which define the environment independent of the presence of a vehicle (roadway surface, inclination of the roadway, curve radius, et cetera), road situation variables which relate to the cooperative relationship of vehicle and environment (aquaplaning, gravel, et cetera), use variables which make possible a user identification for adjusting individually influenceable functions (driver type, seat position adjustment, radio transmitter, et cetera), et cetera. Here, it should be noted that only abstract data such as the identification of a seat type are contained in this higher abstraction level; whereas, the allocation of these abstract variables to the variation-specific variables, such as the seat position to be adjusted, is only present in the detailing level which administers the entire seat adjustment.

It is understood that the foregoing description is that of the preferred embodiments of the invention and that various changes and modifications may be made thereto without departing from the spirit and scope of the invention as defined in the appended claims.

What is claimed is:

1. A control system for a vehicle, the control system comprising:

a plurality of components arranged in the context of a hierarchy at different levels thereof;

at least a first one of said components being at a first one of said levels;

at least a second one of said components being at a second one of said levels lower than said first level;

said second component being adapted to receive and execute commands from said first component for controlling said vehicle;

a plurality of data generators which make data available;

said components being adapted to evaluate said data for executing said commands and with said data generators making said data available;

data inquiries (?) and request relationships (!) being defined as types of communication between each one of said components and every other one of said components and between said components and said data generators;

when transmitting a data inquiry, the transmitting component or data generator being a transmitter and the receiving component or data generator being a receiver and the transmitter having data and said data being made available to the receiver and, for request relationships, the transmitter making data available to the receiver which are to be converted by the receiver;

for each component, the permitted data inquiries (?) and request relationships (!) are pregiven;

a first portion of said components defining a first system and communication relationships being permitted for each component to every other component within said system;

a second portion of said components defining a second system at a level above or below said first system;

for communication relationships to another system beyond the boundaries of the system, only communication relationships are permitted from a system at a lower level to a system at a higher level; in a system, a communication relationship coming from outside said system is transmitted to components at a lower level; and, said data generators, which determine the needed data, are assigned to the highest level of the hierarchy wherein the data for forming the command or to process the command are needed, these data being determined by the data generator.

2. The system of claim 1, wherein one of said components, as a command hierarchy, is subdivided into a plurality of subcomponents defining a subsystem.

3. The system of claim 2, wherein the communication relationship for acquiring information between components within a system is such that a data interrogation and/or a request relationship is possible for each component to every other component.

4. The system of claim 3, wherein the data interrogation and/or request relationships across system boundaries only occur in the direction of higher levels.

5. The system of claim 1, wherein a target component and/or a source component of a data interrogation and/or a request relationship is precisely one component of another system for communication relationships between individual systems.

* * * * *

UNITED STATES PATENT AND TRADEMARK OFFICE
CERTIFICATE OF CORRECTION

PATENT NO.    : 6,092,006
DATED         : July 18, 2000
INVENTOR(S)   : Peter Dominke, Holger Bellmann, Jens-Olaf Mueller, Torsten Bertram, Asmus Volkart, Christian Grosse and Wolfgang Hermsen It is certified that error appears in the above-identified patent and that said Letters Patent is hereby corrected as shown below:

Column 3,
Line 50, delete "126," and substitute -- 126 to -- therefor.

Column 6,
Line 38, delete "δ" and substitute -- ϑ --
Lines 39 and 42, delete "κ and λ" and substitute -- κ and λ -- therefor.
Line 50, delete "κ" and substitute -- κ -- therefor.
Line 59, delete "κ)" and substitute -- κ) -- therefor.

Signed and Sealed this

Thirtieth Day of April, 2002

Attest:

JAMES E. ROGAN
Attesting Officer          Director of the United States Patent and Trademark Office